United States Patent [19]

Hoult

[11] 4,030,450

[45] June 21, 1977

[54] FISH RAISING

[75] Inventor: David P. Hoult, Wellesley, Mass.

[73] Assignee: American Fish Company, Wellesley, Mass.

[22] Filed: July 3, 1975

[21] Appl. No.: 592,733

Related U.S. Application Data

[63] Continuation of Ser. No. 482,751, June 24, 1974, abandoned.

[52] U.S. Cl. .................................................. 119/3
[51] Int. Cl.² ........................................ A01K 61/00
[58] Field of Search ........................... 119/3, 5, 2, 4

[56] References Cited

UNITED STATES PATENTS

| 2,858,799 | 11/1958 | Krauss et al. | 119/5 |
|---|---|---|---|
| 2,944,513 | 7/1960 | Keely | 119/3 |
| 3,116,712 | 1/1964 | Ogden et al. | 119/3 |
| 3,572,291 | 3/1971 | Cavanagh | 119/3 |
| 3,661,262 | 5/1972 | Sanders | 119/3 X |
| 3,773,014 | 11/1973 | Ewald, Jr. | 119/3 |

OTHER PUBLICATIONS

SN 482,751, filed June 24, 1974, parent application to Hoult.

Primary Examiner—Hugh R. Chamblee

[57] ABSTRACT

Raising food fish utilizing apparatus including a fish tank, a biological trickling filter mounted above it and a particulate filter above the trickling filter, by recirculating water from the fish tank first through the particulate filter to remove particulate matter and adjust pH of the water and refrigerate it and then through the trickling filter to remove ammonia and add oxygen, the water in the fish tank being circulated and the fish periodically being fed over a period of months until they reach marketable size.

23 Claims, 14 Drawing Figures

FISH RAISING

This is a continuation of application Ser. No. 482,751, filed June 24, 1974, now abandoned.

This invention relates to raising food fish to marketable size and, more particularly, to novel methods and apparatus therefor.

Although food fish have for many years been raised to marketable size in ponds and streams, attempts to raise food fish to marketable size, of about one pound weight or more, in recirculating water systems at high fish densities of the order of one fish to a gallon of water or less have heretofore not been commercially successful.

It is the major object of the present invention to solve the problems which caused the failure of such heretofore known systems and make possible the commercial raising of food fish to marketable size in such systems.

According to the present invention, novel methods and apparatus provide for continuously maintaining and feeding food fish for a period of months until they reach marketable size and are removed, in a volume of flowing water, preferably in the range of about 300 to 3,000 gallons at a fish to water ratio of at least about one fish per gallon in a water recirculation system. The water is recirculated, preferably at a rate of about 40–100 GPM by removing it from adjacent the bottom of the volume of water and reintroducing it into the top in a generally closed system, that is, a system which has water added to it only for the purpose of making up evaporation and leakage losses or the like. Preferably, the recirculation is intermittent, in order to accomplish economically important energy savings, since less circulation is necessary when the fish are small than when they are more fully grown.

Particulate matter is removed from the recirculating water which is then treated before reintroducing it into the top of the volume of water by biologically removing ammonia from the water to maintain a level of ammonia preferably of less than 2 ppm in said volume; adding oxygen to the water to maintain a level of oxygen preferably of more than 6 ppm in said volume; if necessary adjusting the pH of the water to maintain a pH preferably of between 6.0 to 8.0 in said volume and, if necessary, refrigerating the water to maintain its temperature preferably in the range of 50° to 60° F. The fish are preferably fed with floating food particles, and are harvested from the system before clogging of the trickling filter occurs.

In general, the apparatus of the invention comprises preferably, a generally circular fish tank having feed means and water circulating means, said tank having a depth to diameter ratio of at least 1 to 3 for maintaining the fish in the volume of flowing water. Pump means is preferably intermittently operable, by suitable control means for recirculating the water by removing it from adjacent the bottom of the tank and reintroducing it into the top.

A biological trickling filter tank is preferably mounted above the fish tank for treating the recirculating water before reintroducing it into the top of the volume to remove ammonia and add oxygen to water. A particulate filter tank is preferably mounted above the trickling filter for removing particulate matter from the water prior to its treatment. Refrigerating means may be located between the filters.

In more detail, it is desirable that the trickling filter be in the form of a generally circular open top tank, having a capacity and size of about that of the fish tank, and be mounted above it, generally concentrically therewith, with a bottom outlet for drainage of water from it into the fish tank. The particulate filter may be in the form of a generally annular open top tank mounted above the trickling filter tank, generally concentrically therewith, for drainage of water into the trickling filter tank.

Particulate filter water distribution means is connected to the water recirculation system, and is preferably driven by the water flow, for distributing water, preferably progressively in a predetermined pattern, onto the surface of filter materials in the particulate filter tank. More specifically, the particulate filter water distribution means includes an arm mounted for rotary movement above the particulate filter tank, which arm on its free end has a generally tangentially directed water jet outlet for driving it around the particulate filter tank. Stepping means, responsive to intermittent water flow through the jet outlet, is provided for intermittently stepping the arm with its jet outlet around the particulate filter tank for successive utilization of discrete surface portions of the filter materials therein.

Fish tank food distribution means may be driven by the particulate filter water distribution means responsive to stepping movement thereof and may include a plurality of circumferentially spaced food receptacles mounted on the periphery of said fish tank and a rotatably mounted operating arm, driven by the particulate filter water distribution means, cooperating with said receptacles successively to release food therefrom onto the surface of the water in the fish tank.

Trickling filter water distribution means are connected to the outlet of the particulate filter tank for distributing water onto the surface of filter materials in the trickling filter tank. Fish tank water distribution means are connected to the outlet of the trickling filter tank, the fish tank water distribution means having outlet means positioned above the surface of water in the fish tank, said outlet means being generally tangentially directed to cause circular flow of water in the fish tank, as well as aeration thereof.

For the purpose of more fully explaining further objects and features of the invention, reference is now made to the following detailed description thereof, together with the appended drawings, wherein.

Figure 2:
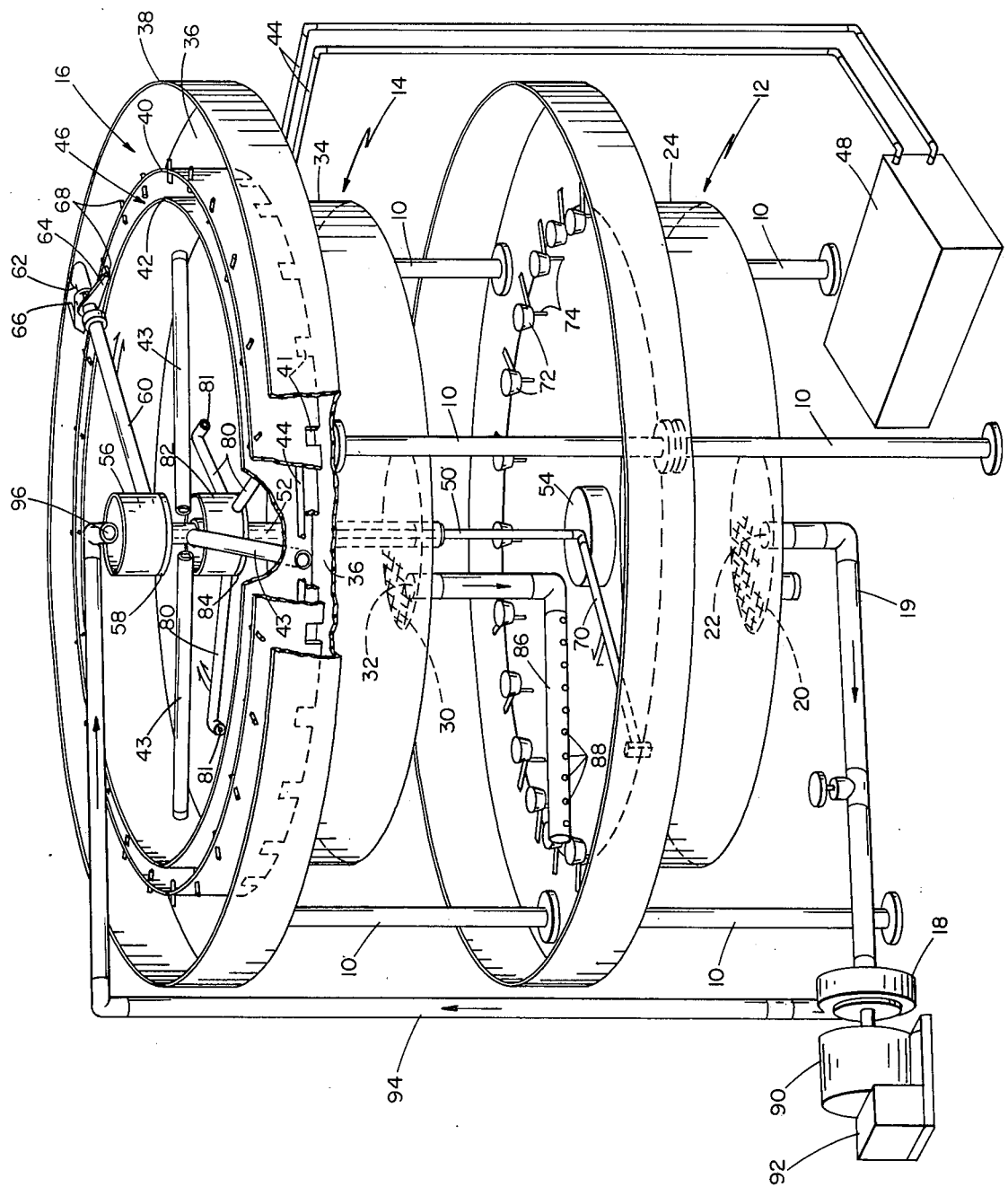
FIG. 2 is an isometric view of apparatus according to the invention.
Figure 3:
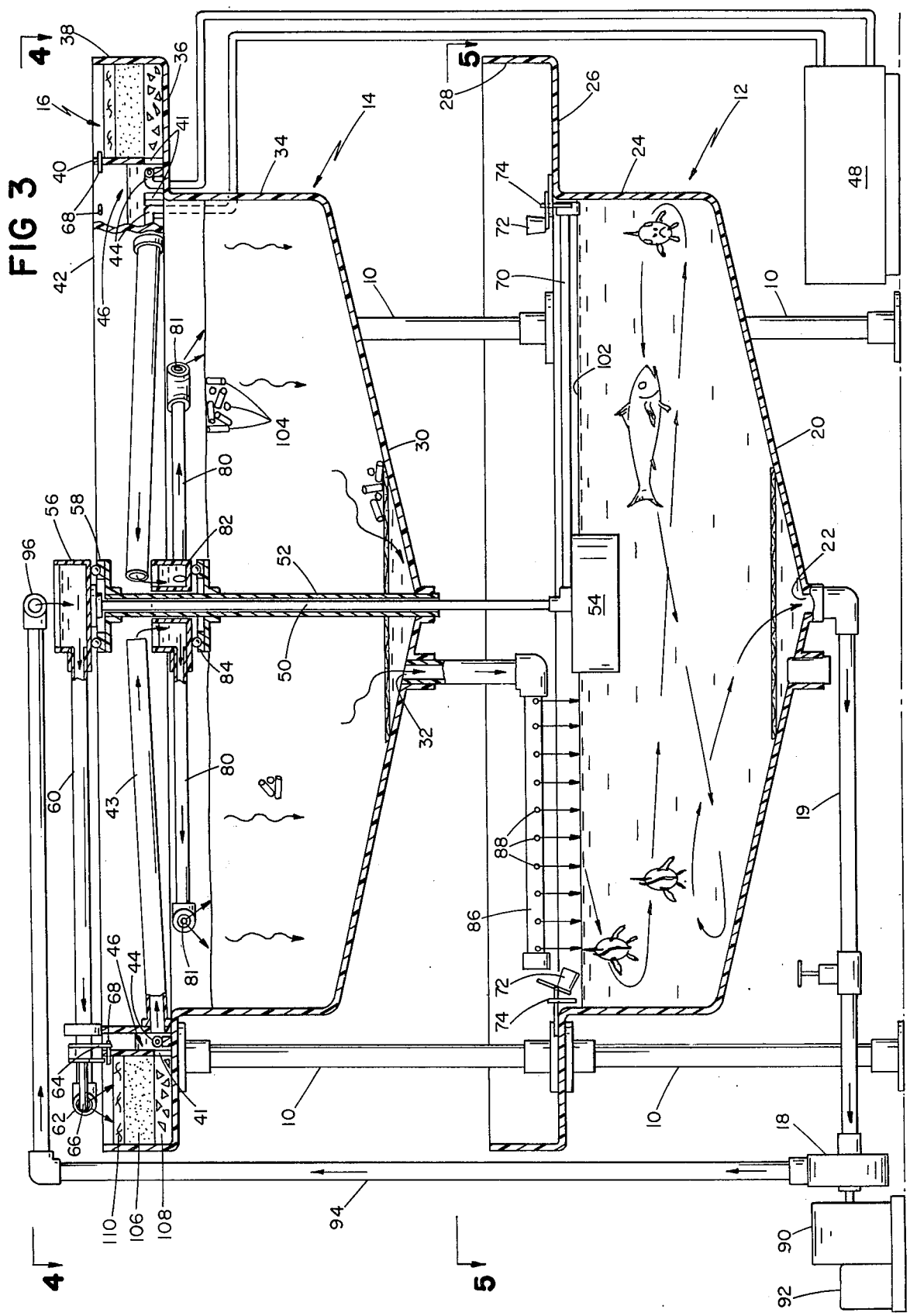
FIG. 3 is a side sectional view of the apparatus of FIG. 2.
Figure 4:
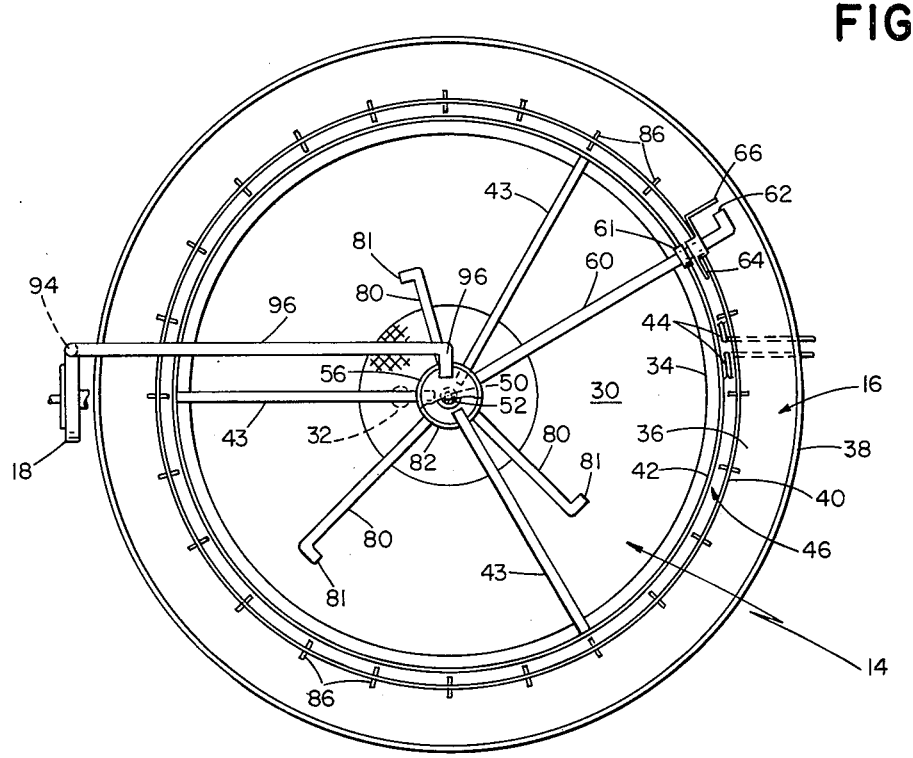
FIGS. 4 and 5 are top sectional views, somewhat diagrammatic, of portions of the apparatus of FIG. 2.
Figure 5:
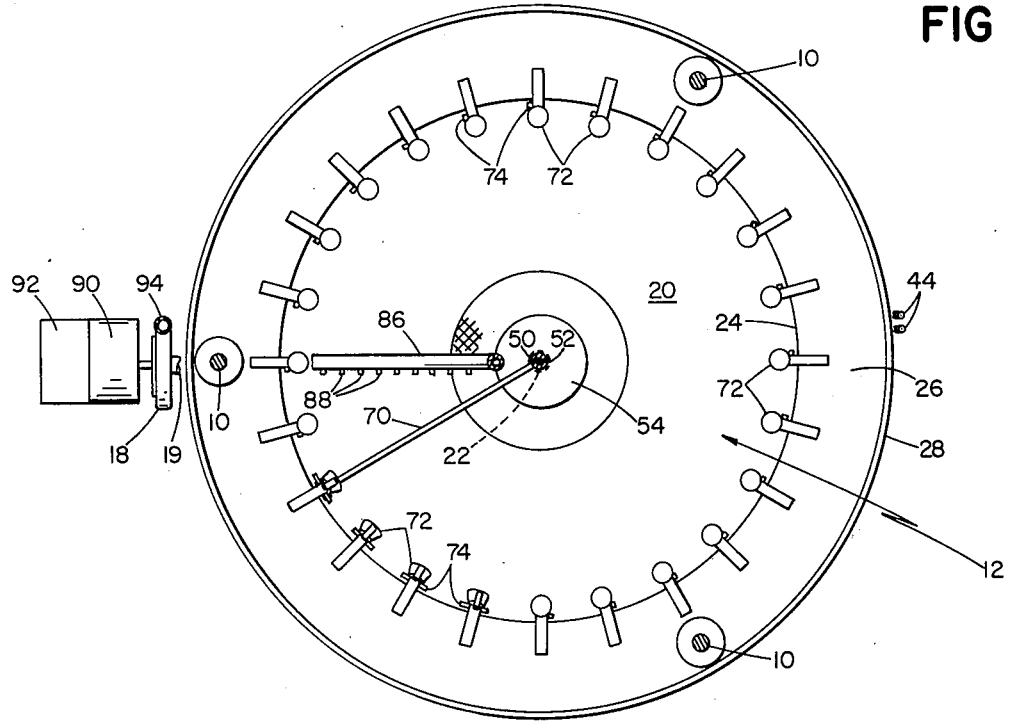
Figure 6:
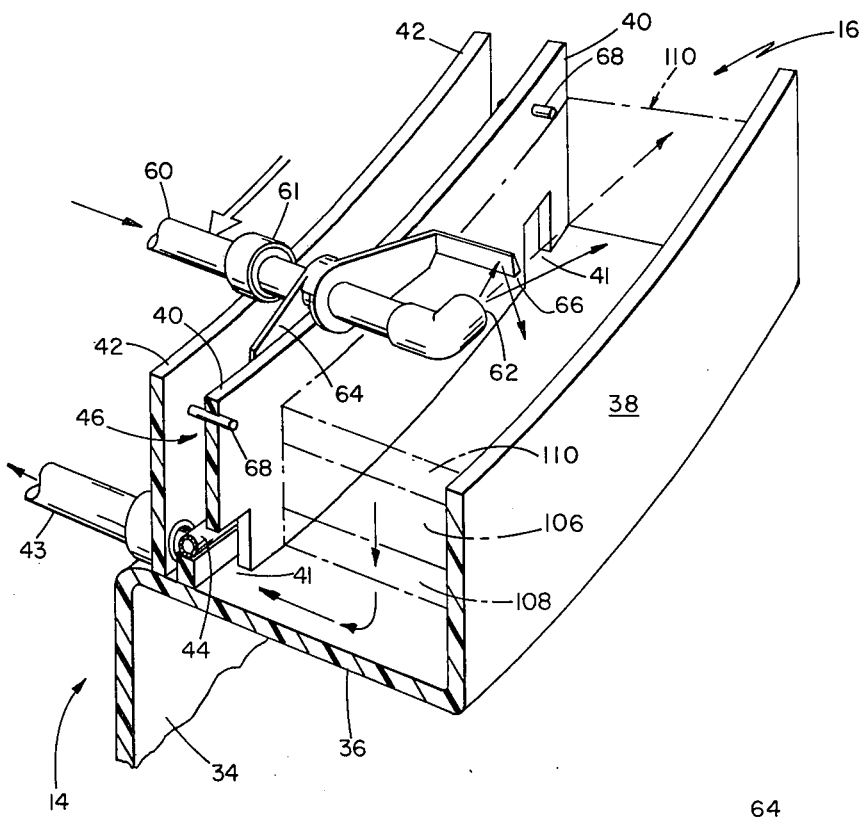
FIG. 6 is a detail view of a portion of the apparatus of FIG. 2.
Figure 7:
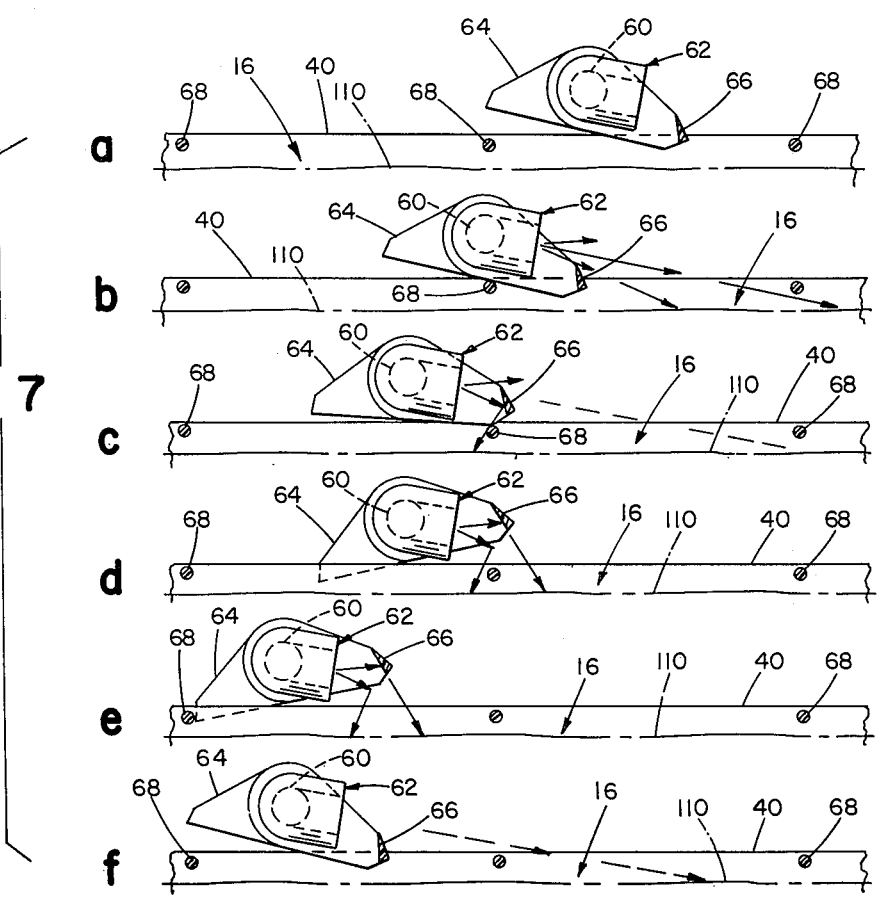
Figure 8:
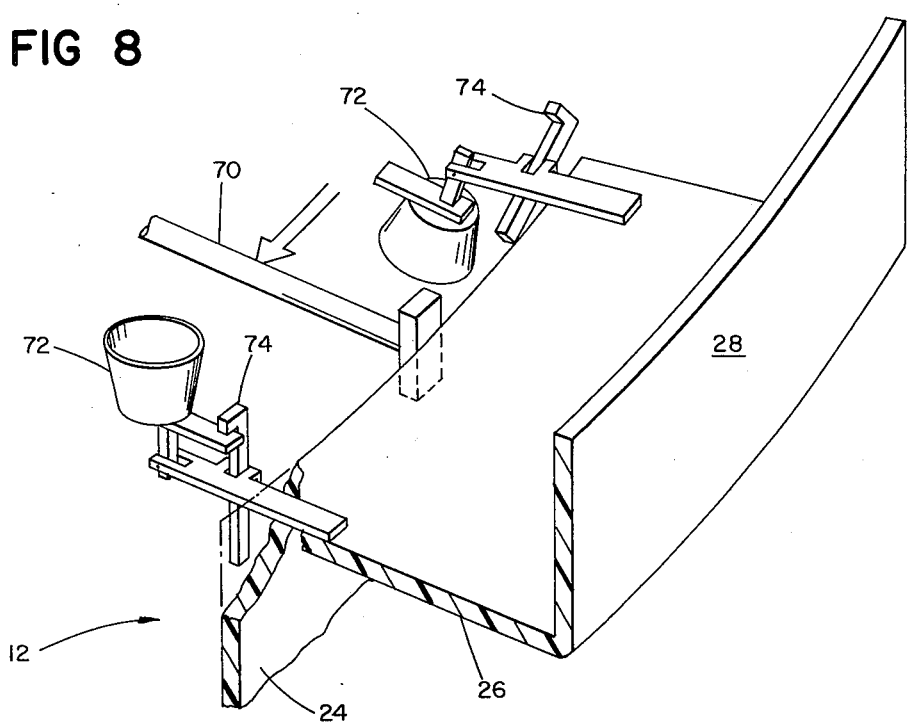

FIGS. 7a through f illustrate the operation of the portion of FIG. 6;

FIG. 8 is a detail view of another portion of the apparatus of FIG. 2; and

Figure 9:
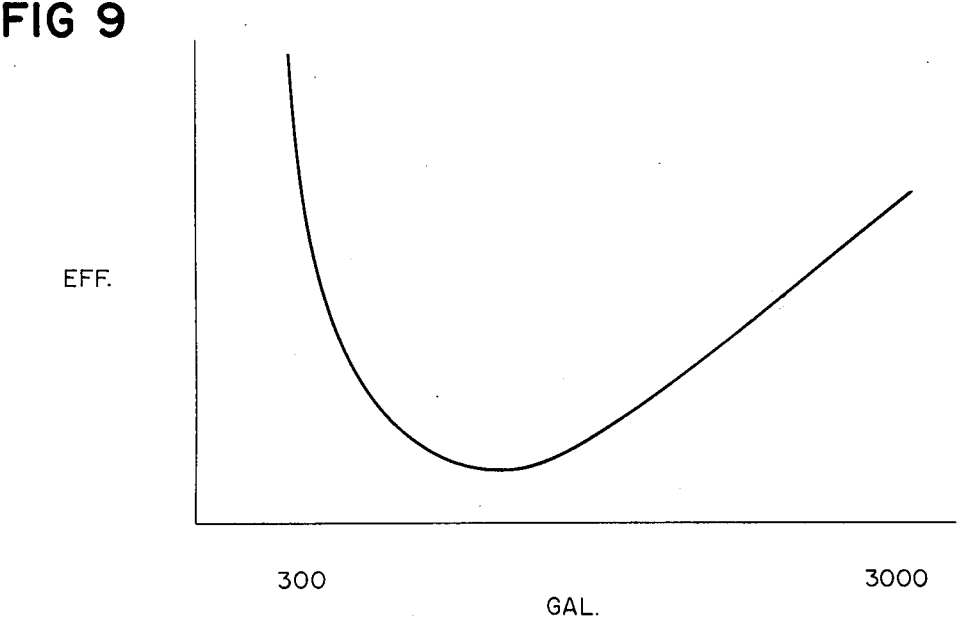

FIG. 9 is a graph of water capacity vs efficiency of the invention.

Referring to the drawings, and especially to FIGS. 2 through 8 thereof, in general, the apparatus of the invention comprises a preferably generally circular, shallow fish tank, generally designated 12, having feed means and water circulating means for the water therein; a biological trickling filter tank, generally designated 14, of about the same volume as that of the fish tank, mounted above it for treating the recirculating water to remove ammonia and add oxygen; and an annular particulate filter tank, generally designated 16, mounted above the trickling filter tank for removing particulate matter from the water prior to its treatment. A pump 18, preferably intermittently operable by suitable control means, as hereinbefore more fully explained, recirculates the water by removing it from adjacent the bottom of the fish tank 12 and introducing it into the particulate filter tank 16.

Fish tank 12 is a generally circular of about six feet diameter, relatively shallow tank of about one one-half foot depth having a conical bottom wall 20 with a central bottom outlet 22, a cylindrical side wall 24 and a rim 26 having an upstanding outer edge wall 28. It is mounted on three vertical standards 10 which support it by its rim 26 and extend thereabove.

The trickling filter tank 14 and particulate filter tank 16 together make up an assembly similar to that of fish tank 12, supported on vertical standards 10 concentrically above fish tank 12. Thus, trickling filter tank 14 is defined by a conical bottom wall 30 having an outlet 32 and a side wall 34, and the annular particulate filter tank 16 by bottom wall 36, upstanding outer edge wall 38 and inner edge wall 40, having water discharge openings 41 therein. Wall 40 forms the outer edge of an annular refrigeration manifold 46 having its inner edge defined by inner wall 42. Refrigerant pipe 44, connected to a refrigeration unit 48 by suitable piping, is positioned adjacent the bottom of refrigeration manifold 46 above its bottom wall 36. A plurality of fixed pipes 43, herein shown as three in number, extend radially inwardly to provide outlets from manifold 46.

The particulate filter water distribution system and the fish tank food distribution system include a vertical shaft 50 extending centrally of and through the trickling filter tank 14 within pipe 52. Pipe 50 at its lower end is rotatably supported by a float 54, and at its upper end carries a cup element 56 which is supported by a thrust bearing 58 mounted on the upper end of pipe 52. For driving shaft 50 with its cup element 52, a horizontally radially extending hollow particulate filter water distribution arm 60 is mounted at one end in a side wall of cup element 52. As best shown in FIG. 6, its free end is supported by roller 61 riding on wall 40 and is positioned above particular filter 16. It has a tangentially directed water jet opening 62 effective to rotate arm 60 and shaft 50 by the reaction of water flowing through jet outlet opening 62.

For controlling the movement of particulate filter water distribution arm 60 to produce stepped movement thereof responsive to intermittent water flow through jet outlet 62, water distribution arm 60 adjacent its outer end carries a rocker element 64, operated by blade 66 positioned in front of jet outlet 62 and by pins 68 mounted on and peripherally spaced around the inner wall 40 of particulate filter 16, as hereinafter more fully explained, in connection with the showing of FIGS. 7a through 7f.

On the lower end of shaft 50 is mounted a food distribution actuating arm 70, which rotates in synchronism with water distribution arm 60 to cooperate with a series of peripheral spaced food cups 72 tiltably mounted about the periphery of wall 24 of fish tank 12 and having a latch element 74 releasable by the free end of arm 70 to allow a cup 72 to tilt and distribute its contents into fish tank 12.

Trickling filter distribution pipes 80, herein shown as three in number, extend radially outwardly from annular cup element 82 rotatably mounted on central pipe 52 by thrust bearing 84, said pipes 80 having on their outer ends, tangentially directed jet outlets 81 for rotating said element 82 and arms 80 by the reaction of water flowing therefrom.

A radially extending fixed pipe 86 connected to trickling filter outlet 32 and having a series of tangential openings 88 overlies the fish tank 12, water flow through said openings creating circular water flow in fish tank 12 and also operating to aerate said water.

In order intermittently to recirculate water from fish tank bottom opening 22, pump 18 is connected to said opening by pipe 19 and is driven by electrical motor 90 under the control of timer 92, to raise water through pump outlet pipe 94, the free end 96 of which is positioned above cup element 56 for flow of recirculated water thereinto.

Figure 1:
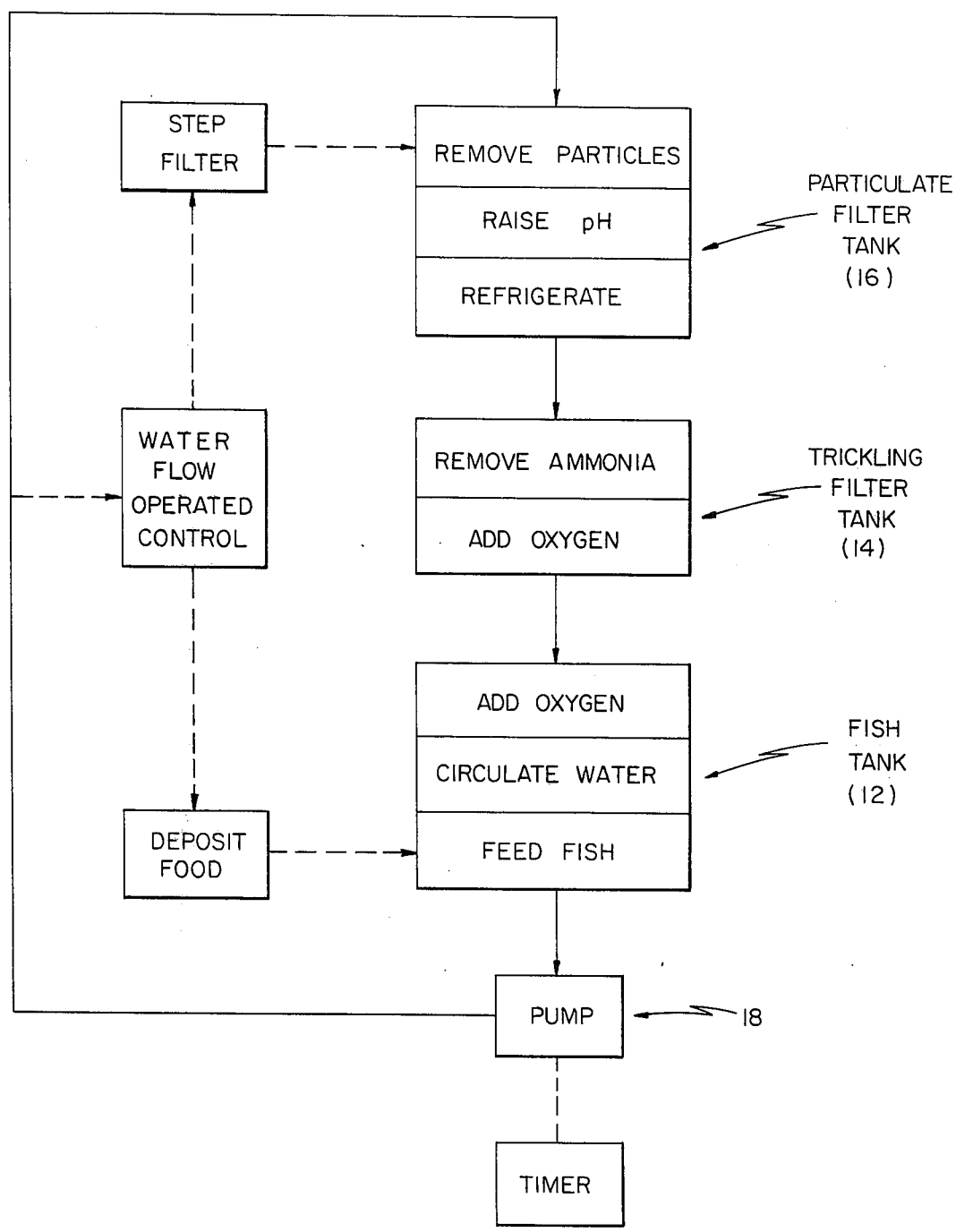
FIG. 1 is a flow diagram illustrating the invention.

In order to operate the above described apparatus in accordance with the methods of the invention, as diagrammatically illustrated in FIG. 1, water tank 12 is filled with about 300 gallons of water to level 102; trickling filter 14 is filled with inert plastic pellets 104 about one-fourth inche in diameter and three-fourth inche long; and particulate filter 16 is charged with a lower layer of activated charcoal 106, an intermediate layer of limestone chips 108 and an upper layer of nylon wool 110 as well as with suitable bacteria, as hereinafter explained. About 400 fish fry are placed in fish tank 12 and pump 18 is operated intermittently by timer 92, for example, in one hour cycles. At each cycle, water flow through the outlet jet 62 of particulate filter was distribution arm 60 steps said arm preferably one-twenty-fourth of the circumference of particulate filter tank 16, as defined by pins 69 on wall 40 (FIGS. 6 and 7a through f) to discharge water on the nylon wool layer 110 progressively in a predetermined pattern for successive utilization of discrete surface portions of the filter materials in particulate filter tank 16. At the same time, the stepping movement of particulate filter arm 60, through vertical shaft 50, steps food distribution arm 70 around the circumference of fish tank 12, each movement thereof operating to trip one of the 24 food cups 72 equally spaced around said circumfrence.

More specifically as to the stopping operation of particulate filter arm 60, as illustrated in FIGS. 7a through f, from its rest position shown in FIG. 7a, the initiation of recirculating water flow through jet outlet 62 (shown by arrows) drives arm 60 in the opposite direction (to the left as shown in FIGS. a through f) with the bottom of rocker element 64 riding over the top of the first succeeding pin 68, (FIGS. 7b and c). At the same time, the water flow against blade 66 causes it to rock element 64 so that its forward edge abuts the next succeeding pin 68 (FIGS. d and e), so further movement of arm 60 is stopped. When water flow ceases, rocker element 64 tilts to its rest position (FIG. 7f) in readiness for another cycle.

From particulate filter tank 16, the recirculating water passes through refrigeration manifold 46 over refrigeration pipe 44 and thence into outlet pipes 43. From the end of outlet pipes 43, it flows into rotatable filter distribution cup 82 and pipes 80, which are rotated by the reaction of the water flowing from the tangentially directed jet outlets 81 thereof. This action distributes the water from the particulate filter around the surface of filter materials in trickling filter tank 14, the biological operation of which will be more fully described hereinafter. From the trickling filter tank 14, the treated water flows through fixed fish tank water distribution pipe 86 and its tangentially directed outlets 88 to cause circular flow of the water in fish tank 12 and to aerate it.

The purpose of the filter system, the mechanical details of which are described above, is to provide a substrate for bacteria. In general, it involves a series of biological transformations in which ammonia produced by the fish and by the decomposition of organic material (food, feces etc.) is ultimately coverted to nitrite. Involved in this system are several classes of both aerobic and anaerobic bacteria which are present in ooze from cold water (between 60° F and 40° F) tidal wetlands and may be provided to the system in that form. In the system, these bacteria are located on the detritus and other surfaces in the system, including the filter materials in the particulate filter and the plastic pellets in the trickling filter, where they accumulate, grow and ultimately product blockages and changes in their local environment. When these changes are severe enough, the capacity of the system to remove ammonia is reduced and an ammonia crisis develops; which, if not arrested, will result in the fish being killed.

The process begins with ammonia produced by metabolism of protein by the fish and by the action of several ammonia fixing heterotrophic bacteria on organic material in the tank. Although several types of reactions may be involved, the following two represent the most common in which amino acids derived from food protein and urea derived from fish excreta are hydrolytically oxidized to ammonia.

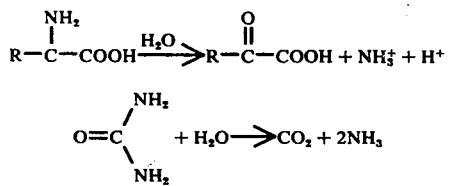

(1)

(2)

This process of ammonification represents probably the major source of ammonia, perhaps as much as 90% of the total. Both anaerobic and aerobic organisms are involved although the anaerobes are less efficient. Although many such organisms may be involved, typical ones include *Klebsiella sp.* and *Aerobacter sp.*

At the next step, nitrification occurs when several species of nitrobacteriaceae convert the ammonia to nitrate. Most of these are aerobes and thus cannot function under anaerobic conditions. The first step in these reactions involves the oxidation of ammonia to nitrite.

$$NH_4^+ + H^+ + OH^- \rightarrow NH_2OH \quad (3)$$

  (4)

Several organisms can be involved including *Nitrosomonas sp.*, *Nitrosocystis oceanus*, *Nitrospira briensis*.

In the second step, the nitrite so formed is oxidized to nitrate.

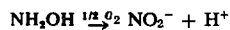  (5)

Among the several organisms known to be involved in these reactions are *Nitrobacter sp.*, *Nitrococcus mobilis* and *Nitrospina gacilis*.

The final step involves the reduction of the nitrate to nitrous oxide or atomspheric nitrogen and proceeds by either of these reactions.

$$4NO_3 + 3CH_4 \rightarrow 2N_2 + 6H_2O \quad (6)$$

$$2NO_3 + 2H_4 \rightarrow N_2O + 2O_2 + H_2O \quad (7)$$

Many different autotrophic and heterotrophic bacteria can carry out these reactions under both aerobic and anaerobic conditions.

Although organisms that can carry out the reactions in the first and last step of this process (eq. 1, 2, 6, 7) can do so both aerobically and anaerobically, the reaction involving nitrofication (eq. 3, 4 and 5) are generally the result of aerobic bacterial action.

Moreover, the growth of the *Nitrobacter sp.* involved in the conversion of nitrite to nitrate are inhibited by the presence of ammonia (Lees, H. Biochem. J., 52: 134-139, 1952). Thus, high levels of ammonia can lead to an accumulation of nitrite in the system. Furthermore, since all of the reactions involved in these systems are acid forming (either $H^+$ or $CO_2$), any environmental condition that result in high ammonia loads can result in a decreasing pH in the system.

Thus, in the system, initial production of ammonia by the ammonification organism results in an initial rise in circulating ammonia levels. After a lag, the denitrifying organisms escape the inhibition and begin to function, reducing the level of ammonia and reducing the pH, since both $CO_2$ and $H^+$ are produced in the system.

The system can become unstable under several conditions including overloading, severe pH and decreased oxygen tension. However, the most common situation appears to occur when both bacterial growth and excessive detritus accumulation serve to produce local anaerobic conditions in the loci where the organisms are positioned, i.e., in the filters. Under these conditions, ammonification continues, since several anaerobes can convert organic nitrogen to ammonia, but nitrification and denitrification are inhibited due to high ammonia levels and the anaerobic conditions. Thus, ammonia levels ring and potentially toxic conditions are produced in the tanks; this may be referred to as "clogging" the filters. Clearing, in part, the filters and stirring the filter material helps relieve the ammonia accumulation, but the high ammonia levels result in inhibition of the denitrifying bacteria. When they begin to function, ammonia levels continue to fall as does the pH. Recovery from an ammonia crisis always appears to be accompanied by a downward change in pH.

Thus, prevention of increases in ammonia levels is dependent upon limiting the accumulation of detritus in the filters, but not totally preventing it, and in the fish tank itself in the form of limiting the accumulation of detritus and excreta, as well as excess food, which is a reason it is desirable to use food which floats rather than sinks, and that the drain from the tank is at the bottom. In addition, it is helpful to prevent anaerobic conditions from developing, for example, by maintaining high enough flow rates to prevent areas of stagnation of water and accumulation of debris in the system.

Trickling filters work substantially better than submerged filters to achieve these biological effects, because the water being treated is in continual contact with oxygen from the air. Thus, anaerobic conditions are less likely to occur in a trickling filter than a submerged filter. In the above described apparatus the main ammonia removal device is the trickling filter placed directly above the fish tank. It is preferred that the volume of the trickling filter be about the same as the volume of the fish tank. It is also preferred that it be located above the fish tank so that when the pump operates intermittently, or fails, the trickling filter drains its oxygenated water into the fish tank.

The dimensions of the trickling filter and the pellets therein are chosen so that in a six month fish production cycle, the filter just begins to clog. The volume — i.e., depth and area — of the trickling filter is so chosen that, using the method of Howland, the ammonia removal rate is in excess of that produced by 1,000 Kg. of fish.

The main problem with all biological filters is associated with clogging. When clogging occurs, localized volumes of the filter become anaerobic, causing ammonia to be produced rather than removed by the filter. For this reason, it is imperative to have a particulate filter upstream of the trickling filter. In addition, the particulate filter must be accessible for easy cleaning. It must be shallow, so that its substrate can be removed for easy washing — rather than using the conventional backwashing systems on deep rapid sand filters which introduce new, potentially contaminated water into the system.

The particulate filter as above described containing nylon wool, limestone chips and activated charcoal, removes particulates, certain organic materials, and buffers the system to the acceptable pH range.

To insure maximum oxygen absorption from the air, the water leaving the trickling filter passes over the evaporator pipe 44 of the refrigeration system to cool it before being distributed over the trickling filter by its rotating arm assembly.

With this overall configuration, it is found that there is an optimum volume for the fish tank, where least pump power/lb. of fish is required to well mix the water and achieve the desired wter quality by the means described above. This optimum is quite broad, in terms of cost/yield, but nevertheless is well defined and lies in the range from 300 to 3,000 gallons, as illustrated in FIG. 9. The fish tank described above contains 300 gallons of water; the lower end of the preferred range.

The above described invention has been successfully operated to raise food fish, such as trout and salmon from fry of about 2 gm size to marketable size of about 500 gm by continuously maintaining a quantity of about 400 of them in a volume of about 300 gallons of at least intermittently flowing fresh water for a period of 6 months, after which time they have grown to a marketable size of about one pound. It is also contemplated that salt water may be used.

At least for trout and salmon, the dissolved oxygen in the water in the fish tank must be maintained in the range from 6 ppm. to 12 ppm. The water temperature should be maintained between 50° to 60° F. The pH must be in the range from 6.0 to 8.0. The ammonia in the water must be in the range from 0.1 ppm to 2.0 ppm. Turbidity should be such that one can clearly see through 18 inches of water.

When these parameters are maintained by the system, the trout or salmon grow at an exponential rate which takes 2 gm fish into 1 lb. (454 gm) fish in six months. With the system described herein, 200 Kg. of fish, about 400 in number can be grown at this rate in 300 gallons of fresh water.

Since the half time for digestion of food by trout or salmon is about one hour, pump 18 is operated intermittently by timer 92 in 1 hour cycles. The "on" time of the pump may be varied from 2 minutes each hour to 59 minutes each hour, and is adjusted to increase as the fish grow, reaching 59 minutes/hour as the fish reach 1 lb., and the tank loading, 200 Kg. As explained above, the controlled stepped rotation of arm 60 operates so that each hour the fish are fed with floating fish food in order to reduce the filter load, and at each feeding, a new, clean area of the particulate filter removes the feces, uneaten food and other debris.

The particulate filter is cleaned once a day and the 24 food cups are replenished once a day.

Preferably, the entire system is placed in a closed room in which is continually maintained a low level of illumination, so that the fish feed and grow 24 hours/day.

It is contemplated that many varieties of fish other than trout and salmon, both fresh and salt water, may similarly be raised in systems according to the invention.

What is claimed is:

1. A method of raising trout and salmon for food fish from fry to marketable size over a period of months comprising the steps of:
  continuously maintaining said fish for a period of months in a volume of flowing water in the range of about 300 to 3,000 gallons at a fish to water ratio of at least about one fish per gallon
  periodically intermittently recirculating said water at intervals by removing it from adjacent the bottom of said volume and reintroducing it into the top of said volume in a generally closed system by causing it periodically intermittently to flow in said system in increasing quantity over said period of months as said fish grow in size
  treating said recirculating water before reintroducing it into the top of said volume by:
  removing particulate matter from said water
  removing ammonia from said water to maintain a level of ammonia of less than about 1 ppm in said volume
  adding oxygen to said water to maintain a level of oxygen of more than about 6 ppm in said volume
  adjusting the pH of said water to maintain a pH of between 6.0 and 8.0 in said volume and
  refrigerating said water to maintain the temperature of said volume of water in the range of about 50° to 60° F.
  periodically feeding said fish at intervals with floating food particles an increasing quantity of food over said period of months as said fish grow in size and
  removing said fish from said volume after they reach marketable size.

2. A method as claimed in claim 1 wherein
  said water is intermittently recirculated by causing it at intervals intermittently to flow in said system for increasing lengths of time within said intervals over said period of months as said fish grow in size.

3. A method as claimed in claim 2 wherein
  said fish are fed an increasing quantity of food at said intervals over said period of months as said fish grow in size.

4. Apparatus for raising food fish to marketable size over a period of months comprising a fish tank for maintaining said fish in a volume of water pump means for recirculating said water by removing it from said tank and reintroducing it into said tank in a generally closed system treating filter means for treating said recirculating water before reintroducing it into said volume to remove ammonia from said water and add oxygen to said water particulate filter means for removing particulate matter from said water feed means for feeding said fish and control means for intermittently periodically at intervals operating said pump means for increasing lengths of time within said intervals over said period of months for periodic intermittent recirculation of said water for increasing lengths of time within said intervals over said period of months as said fish grow in size.

5. Apparatus for raising food fish to marketable size over a period of months comprising a fish tank for maintaining said fish in a volume of water pump means for recirculating said water by removing it from said tank and reintroducing it into said tank in a generally closed system a trickling filter tank for treating said recirculating water before reintroducing it into the top of said volume to remove ammonia from said water and add oxygen to said water a particulate filter tank mounted above said trickling filter tank for removing particulate matter from said water prior to said treating of said water feed means for feeding said fish with floating food particles circulating means for circulating said water in said fish tank to cause it to flow in a generally circular path and control means for simultaneously intermittently periodically at intervals operating said pump means and said feed means for simultaneous periodic intermittent recirculation of said water and feeding of said fish.

6. Apparatus for raising food fish to marketable size over a period of months comprising a fish tank having a water capacity in the range of about 300 to 3,000 gallons for continuously maintaining said fish for a period of months in a volume of flowing water at a fish to water ratio of at least about one fish per gallon pump means for recirculating said water by removing it from adjacent the bottom of said tank and reintroducing it into the top of said tank in a generally closed system p1 a trickling filter tank mounted above said tank for treating said recirculating water before reintroducing it into the top of said volume to remove ammonia from said water and add oxygen to said water a particulate filter tank mounted above said trickling filter tank for removing particulate matter from said water prior to said treating of said water feed means for feeding said fish with floating food particles circulating means for circulating said water in said fish tank to cause it to flow in a generally circular path and control means for simultaneously intermittently periodically at intervals operating said pump means and said feed means for simultaneous periodic intermittent recirculation of said water and feeding of said fish.

7. Apparatus for raising food fish to marketable size, comprising:

a generally open top fish having an outlet a trickling filter tank mounted above said fish tank and having a bottom outlet for drainage of water therefrom into said fish tank.

a particulate filter tank mounted above said trickling filter tank generally for drainage of water therefrom into said trickling filter tank water recirculation means, including a pump, connected to the outlet of said fish tank for removing water from said fish tank particulate filter water distribution means connected to said water recirculation means for distributing water onto the surface of filter materials in said particulate filter tank, trickling filter water distribution means connected to the outlet of said particulate filter tank for distributing water onto the surface of filter materials in said trickling filter tank fish tank water distribution means connected to the outlet of said trickling filter tank and fish tank food distribution means for distributing food particles to said fish tank.

8. Apparatus as claimed in claim 7 wherein:

said particulate filter water distribution means is driven by recirculation of said water.

9. Apparatus as claimed in claim 47 wherein said food distribution means is driven by recirculation of said water.

10. Apparatus as claimed in claim 7 further comprising control means including timing means for intermittently operating said pump means for intermittent recirculation of water.

11. Apparatus for raising food fish to marketable size, comprising:

a generally open top fish tank having a bottom outlet a trickling filter tank, having a capacity and size of about that of said fish tank, mounted above said fish tank and having a bottom outlet for drainage of water therefrom into said fish tank a generally annular particulate filter tank mounted above said trickling filter tank for drainage of water therefrom into said trickling filter tank generally closed circuit water recirculation means, including a pump, connected to the bottom outlet of said fish tank for removing water from the bottom of said fish tank particulate filter water distribution means connected to said water recirculation means for progressively distributing water in a predetermined pattern onto the surface of filter materials in said particulate filter tank, trickling filter water distribution means connected to the outlet of said particulate filter tank for distributing water onto the surface of filter materials in said trickling filter tank fish tank water distribution means connected to the outlet of said trickling filter tank, said fish tank water distribution means having outlet means positioned above the surface of water in said fish tank, said outlet means being generally tangentially directed to cause circular flow of water in said fish tank fish tank food distribution means for distributing floating food particles on the surface of water in said fish tank and control means for intermittently operating said pump means for intermittent recirculation of water.

12. Apparatus as claimed in claim 11 wherein said particulate filter water distribution means is mounted for rotary movement above said particulate filter tank and includes a generally tangentially directed water jet outlet for driving said particulate filter water distribution means including said jet outlet around said particulate filter tank and stepping means responsive to intermittent water flow through said jet outlet for imtermittently stepping said jet outlet around said particulate filter tank for successive utilization of discrete surface portions of filter materials therein.

13. Apparatus as claimed in claim 12 wherein said fish tank food distribution means is driven by said particulate filter water distribution means responsive to stepping movement thereof.

14. Apparatus as claimed in claim 13 wherein said fish tank food distribution means includes a plurality of circumferentially spaced food receptacles mounted on the periphery of said fish tank and a rotatably mounted operating arm, driven by said particulate filter water distribution means, cooperating with said receptacles successively to release food therefrom.

15. Apparatus for raising food fish to marketable size, comprising:

a generally open top circular fish tank having a capacity of between about 300 to 3000 gallons of water and a depth to diameter ratio of at least 1:3 and having a bottom outlet a generally circular open top trickling filter tank, having a capacity and size of about that of said fish tank, mounted above said fish tank generally concentrically therewith and having a bottom outlet for drainage of water therefrom into said fish tank a generally annular open top particulate filter tank mounted above said trickling filter tank generally concentrically therewith for drainage of water therefrom into said trickling filter tank generally closed circuit water recirculation means including a pump connected to the bottom outlet of said fish tank for removing water from the bottom of said fish tank control means including timing means for intermittently operating said pump for intermittent recirculation of water particulate filter water distribution means connected to said water recirculation means for progressively distributing water in a predetermined pattern onto the surface of filter materials in said particulate filter tank.

said particulate filter water distribution means being mounted for rotary movement above said particulate filter tank and including a generally tangentially directed water jet outlet for driving said means including said jet outlet around said particulate filter tank and stepping means responsive to intermittent water flow through said jet outlet for intermittently stepping said jet outlet around said particulate filter tank for successive utilization of discrete surface portions of filter materials therein trickling filter water distribution means connected to the outlet of said particulate filter tank fish tank water distribution means connected to the outlet of said trickling filter tank, said fish tank water distribution means having outlet means positioned above the surface of water in said fish tank, said outlet means being generally tangentially directed to cause circular flow of water in said fish tank and fish tank food distribution means for distributing floating food particles on the surface of water in said fish tank, including a plurality of circumferentially spaced food receptacles mounted on the periphery of said fish tank and a rotatably mounted operating arm, driven by said particulate filter water distribution means, cooperating with said receptacles successively to release food therefrom.

16. Apparatus as claimed in claim 15, further including refrigeration means having a manifold connected to the outlet of said particulate filter tank for cooling water from said particulate filter said trickling filter water distribution means being connected to said refrigeration manifold for distributing refrigerated water onto the surface of filter materials in said trickling filter tank.

17. A method of raising food fish over a period of months comprising the steps of:

continuously maintaining said fish for a period of months in a generally uniform volume of water in a tank of uniform volume periodically intermittently recirculating said water by removing it from said tank and reintroducing it into said tank in a generally closed system by causing it at intervals periodically intermittently to flow in said system for increasing lengths of time within said intervals over said period of months as said fish grow in size and feeding said fish an increasing quantity of food at said intervals over said period of months as said fish grow in size.

18. A method as claimed in claim 17 further including the steps of removing ammonia from and adding oxygen to said water.

19. A method as claimed in claim 17 wherein said intervals are generally equal to the half time for digestion of food by said fish.

20. A method as claimed in claim 19 wherein said intervals are about 1 hour.

21. A method as claimed in claim 20 wherein said fish are trout and salmon.

22. A method of raising food fish over a period of months comprising the steps of:

continuously maintaining said fish for a period of months in a generally uniform volume of water in a tank of uniform volume periodically intermittently recirculating said water by removing it from said tank and reintroducing it into said tank in a generally closed system by causing it periodically intermittently to flow in said system in increasing quantity over said period of months as said fish grow in size and feeding said fish an increasing quantity of food over said period of months as said fish grow in size.

23. A method as claimed in claim 22 wherein said feeding is intermittent simultaneous with said recirculation.

* * * * *

UNITED STATES PATENT OFFICE
CERTIFICATE OF CORRECTION

Page 1 of 2

Patent No. 4,030,450    Dated June 21, 1977

Inventor(s) David P. Hoult

It is certified that error appears in the above-identified patent and that said Letters Patent are hereby corrected as shown below:

Column 1, line 45, "6.0 to 8.0" should be --6.0 and 8.0--;

Column 3, line 10, "hereinbefore" should be --hereinafter--;

Column 4, line 27, "inch" is misspelled;

Column 4, line 27, "three-fourth inche" should be --three-fourths inch--;

Column 4, line 36, "was" should be --water--;

Column 4, line 38, "69" should be --68--;

Column 4, line 48, "circumference" is misspelled;

Column 4, line 49, "stopping" should be --stepping--;

Column 5, line 24, "product" should be --produce--;

Column 6, line 17, "nitrofication" should be --nitrification--;

Column 6, line 46, "ring" should be --rise--;

UNITED STATES PATENT OFFICE
CERTIFICATE OF CORRECTION

Patent No. 4,030,450  Dated June 21, 1977

Inventor(s) David P. Hoult

It is certified that error appears in the above-identified patent and that said Letters Patent are hereby corrected as shown below:

Column 7, line 42, "water" is misspelled;

Column 9, line 54, delete "pl";

Column 10, line 6, after "fish", insert "tank";

Column 10, line 31, "47" should be --7--.

Signed and Sealed this

Twenty-seventh Day of September 1977

[SEAL]

Attest:

RUTH C. MASON  
Attesting Officer

LUTRELLE F. PARKER  
Acting Commissioner of Patents and Trademarks